(12) United States Patent
McMiles

(10) Patent No.: US 8,376,314 B2
(45) Date of Patent: Feb. 19, 2013

(54) METHODS AND APPARATUS TO EXCLUDE FUNCTION FLUID OR SEAWATER FROM SOLENOID ARMATURE CAVITIES IN SUBSEA OR SURFACE SOLENOID VALVES

(75) Inventor: Barry James McMiles, Katy, TX (US)

(73) Assignee: The Subsea Company, Houston, TX (US)

( * ) Notice: Subject to any disclaimer, the term of this patent is extended or adjusted under 35 U.S.C. 154(b) by 830 days.

(21) Appl. No.: 11/712,787

(22) Filed: Mar. 1, 2007

(65) Prior Publication Data

US 2007/0205383 A1    Sep. 6, 2007

Related U.S. Application Data

(60) Provisional application No. 60/778,326, filed on Mar. 2, 2006.

(51) Int. Cl.
*F16K 31/02*    (2006.01)

(52) U.S. Cl. ........... 251/129.07; 251/129.15; 251/54; 137/625.64; 335/255; 335/260

(58) Field of Classification Search ........... 251/129.15, 251/54, 129.07; 335/255, 260; 137/625.63–625.66
See application file for complete search history.

(56) References Cited

U.S. PATENT DOCUMENTS

| | | | | |
|---|---|---|---|---|
| 2,923,521 A * | 2/1960 | Ray | ............................... | 251/54 |
| 3,098,635 A * | 7/1963 | Delaporte et al. | ............ | 251/54 |
| 3,103,612 A * | 9/1963 | Marmo | ........................ | 335/240 |
| 3,108,777 A * | 10/1963 | Ray | ............................. | 251/54 |
| 3,159,774 A * | 12/1964 | Dube et al. | ................... | 335/240 |
| 3,226,605 A * | 12/1965 | Wright et al. | ................ | 335/240 |
| 3,307,574 A * | 3/1967 | Anderson | ..................... | 137/312 |
| 3,326,511 A * | 6/1967 | Hallgreen | ..................... | 251/54 |
| 3,329,165 A * | 7/1967 | Lang | ........................ | 137/625.5 |
| 3,472,483 A * | 10/1969 | Janczur | ................... | 251/129.07 |
| 3,921,660 A * | 11/1975 | Kowalski | .................... | 137/236.1 |
| 4,052,997 A * | 10/1977 | De Lorenzo et al. | ......... | 137/312 |
| 4,763,872 A * | 8/1988 | Ichihashi et al. | ........... | 251/30.01 |
| 5,240,227 A * | 8/1993 | Sich | ........................ | 251/129.16 |
| 6,053,202 A * | 4/2000 | Cunningham | .......... | 137/596.16 |
| 6,116,269 A * | 9/2000 | Maxson | ..................... | 137/487.5 |
| 6,814,104 B2 * | 11/2004 | Dean | ....................... | 137/625.65 |
| 2005/0001183 A1* | 1/2005 | Hironaka | ....................... | 251/50 |
| 2005/0151099 A1* | 7/2005 | Bell et al. | ....................... | 251/1.1 |

* cited by examiner

Primary Examiner — John K Fristoe, Jr.
Assistant Examiner — Marina Tietjen

(57) ABSTRACT

A controllable solenoid valve having a sealed chamber that isolates the armature cavity from the function fluid or external water sources with oil or dielectric fluid and is ported to a reservoir or to a surrounding housing to maintain fluid communication with the armature cavity. The valve may also have a closed internal chamber filled with oil or dielectric fluid to maintain isolation of the armature cavity from the function fluid or other water sources. The closed chamber may also encompass the electrodes or the coil of the solenoid. In a preferred embodiment, the chamber is in fluid communication with transducers that sense fluid pressure.

12 Claims, 3 Drawing Sheets

METHODS AND APPARATUS TO EXCLUDE FUNCTION FLUID OR SEAWATER FROM SOLENOID ARMATURE CAVITIES IN SUBSEA OR SURFACE SOLENOID VALVES

CROSS REFERENCE TO RELATED APPLICATIONS

The present application is related to the following U.S. patent application: provisional patent application No. 60/778,326 titled Methods and apparatus to exclude function fluid, seawater or other fluids from solenoid armature cavities in subsea solenoid valves filed Mar. 2, 2006.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of sub sea and surface solenoids and more specifically to an improved undersea non electrolytic fluid filled solenoid.

BRIEF SUMMARY OF THE INVENTION

The primary advantage of the invention is to provide an improved solenoid life and mitigate the possibility of failure.

Another advantage of the invention is to provide an improved solenoid that resists undersea corrosion and is not conducive to function fluid contamination.

Another advantage of the invention is to provide a solenoid with a non electrolytic fluid like oil ported into the armature chamber to resist undersea corrosion.

Another advantage of the invention is that it will prevent corrosion of the internal threads of the armature where the plunger rod connects, thus preventing failure of this connection which in turn results in the failure of the valve.

Another advantage of the invention is that it will prevent the intrusion of contaminated fluid into the armature cavity which could create a physical hindrance to the movement of the armature resulting in valve failure.

Another advantage of the invention is that the fluid in the armature cavity can be supplied by an external or internal source.

Another advantage of the invention is that the fluid in the armature cavity can have a positive pressure induced so the internal pressure is above ambient and external fluids cannot be introduced into the cavity or coil area.

Another advantage of the invention is that the fluid in the armature cavity can have passage to the coil so that all can have induced pressure so as to not allow non-electrolytic fluids to ingress and cause valve failure.

Another advantage of the invention is that the fluid in the armature cavity can be adapted to several different valves in a similar manner and therefore is not exclusive to the valve shown in the figure.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a controllable subsea solenoid valve, having a valve housing, a slide which is displaceable in the valve housing in an axial direction of the housing between first and second final positions, a seal about the slide which defines a chamber, the chamber filled with a dielectric fluid which surrounds the slide, a spring acting upon the slide counter to the magnetic force to maintain the slide in one of the final positions when the electromagnet is not sufficiently energized to drive the slide with force sufficient to completely overcome force of a spring, and a solenoid comprising an electromagnet, the solenoid being operatively connected to the slide so that sufficient electrical energization of the solenoid to produce a magnetic force sufficient to completely overcome force of the spring displaces the slide from one of the final positions to the other of the final positions.

In accordance with another preferred embodiment of the invention, there is disclosed a controllable subsea solenoid valve, having a valve housing, an armature which is displaceable in the valve housing in an axial direction of the housing between first and second final positions, a seal which defines a chamber, where the chamber is filled with a dielectric fluid which engages the armature, a spring acting upon the armature counter to the magnetic force to maintain the armature in one of the final positions when the electromagnet is not sufficiently energized to drive the armature with force sufficient to completely overcome force of a spring, and a solenoid comprising an electromagnet, the solenoid being operatively connected to the armature so that sufficient electrical energization of the solenoid to produce a magnetic force sufficient to completely overcome force of the spring displaces the armature from one of the final positions to the other of the final positions.

In accordance with another preferred embodiment of the invention, there is disclosed a controllable subsea solenoid valve, having a valve housing, a slide which is displaceable in the valve housing in an axial direction of the housing between first and second final positions that permit flow of function fluid, a seal about said slide which defines a closed chamber, said chamber filled with a dielectric fluid which isolates said slide from said function fluid, a spring acting upon the slide counter to the magnetic force to maintain the slide in one of the final positions when the electromagnet is not sufficiently energized to drive the slide with force sufficient to completely overcome force of a spring, and a solenoid comprising an electromagnet, the solenoid being operatively connected to the slide so that sufficient electrical energization of the solenoid to produce a magnetic force sufficient to completely overcome force of the spring displaces the slide from one of the final positions to the other of the final positions.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for later filed claims and as a representative basis for teaching one skilled in the art to employ the present invention in virtually any appropriately detailed system, structure or manner.

In the prior art, a control fluid in a solenoid valve is not sealed from the armature chamber and hence causes corrosion and contamination over time. In a typical application, the control fluid is fresh water based fluid which may also have salt water intrusion and contamination that interacts with the iron or steel armature, in an electrolytic process that causes corrosion and failure of the valve. Typically these types of solenoid valves are present in subsea oil production where failure of the valve can be catastrophic. The downtime associated with replacing the valve can cost millions of dollars and costly delays. The improvement shown herein will greatly reduce down time and prevent the types of corrosion that have plagued the industry. The improvements will extend the service life of the valve that would otherwise be reduced due to corrosion.

Replacement of these valves presents numerous problems in that each time the solenoids are removed to clean and lubricate the armature and bore, there is a possibility of misalignment, incorrect adjustment, torque miscues or simple physical damage which affects downtime. By reducing the amount of required maintenance, operators greatly reduce the occurrence of these possibilities.

Harmful results occur from the following sequence of events. The armature cavity is air filled on initial installation. During the BOP run, seawater equalizes pressure through the vent check. Seawater then migrates throughout the valve and the armature cavity. By design, exhaust fluid is directed directly out through the vent check. Thus, oxygen rich contaminated water is then concentrated in the armature cavity which results in corrosion that can plug the filter so that it becomes cyclic until valve failure. Corrosion can cause the valve to stick and it results in high replacement and maintenance expenses.

Figure 1:
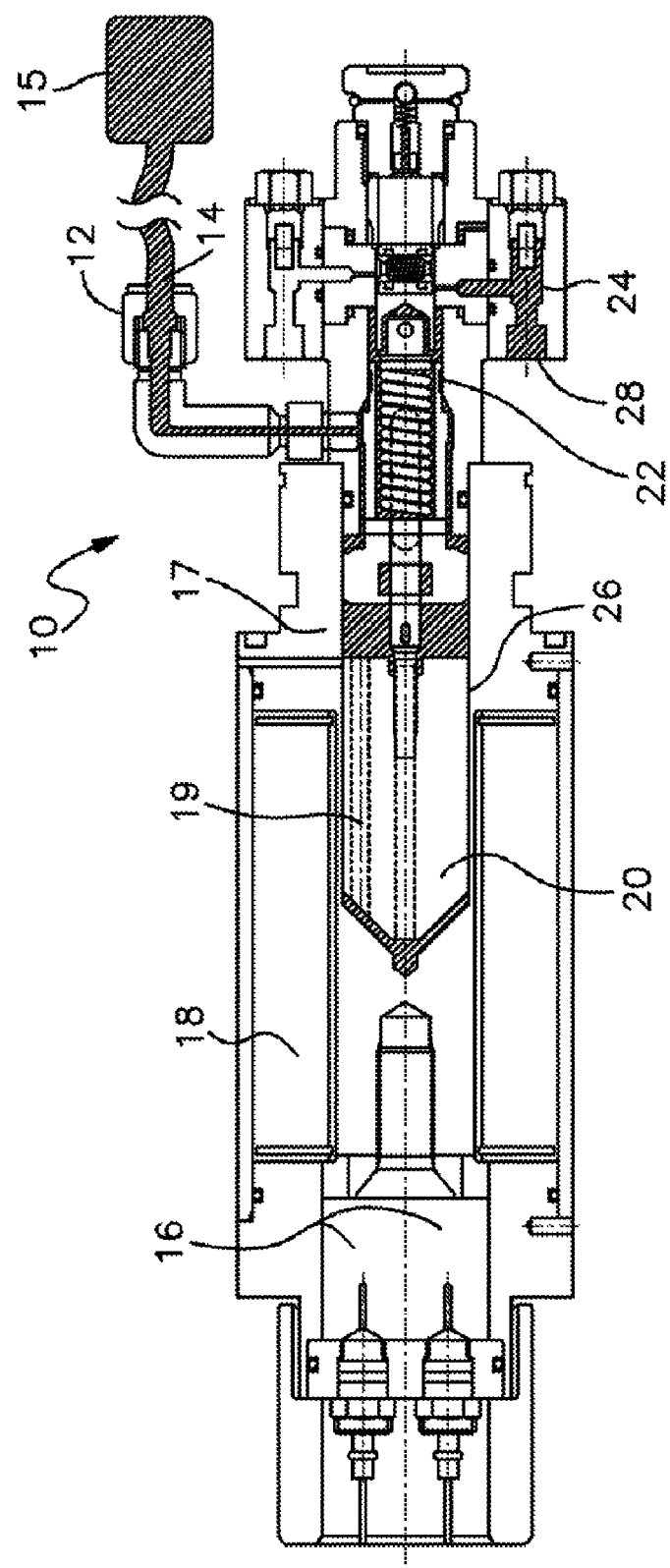
FIG. 1 is a cross sectional schematic diagram of a solenoid showing an external pressurized port for introduction of oil to the armature chamber.

Turning now to FIG. 1, there is shown a cross sectional view of a solenoid valve 10 of a preferred embodiment of the present invention. Solenoid valve 10 is shown with coil 18 and electrodes 16 with an external port 12 for introduction of chamber fluid 14 from a pressurized reservoir 15 to a chamber 17 sealed off by seals 22. Seals 22 prevent introduction of control or function fluid 24 to the armature chamber 26. Armature 20 is thus contained within armature chamber 26 which is filled with fluid and sealably separated from the function fluid that flows out port 28 upon activation of the solenoid. Armature 20 has a fluid flow passageway 19 that permits fluid communication between the portion of the chamber that engages seals 22 and the portion of the chamber on the opposite end of the armature 20. As armature 20 is activated and moves in a position that permits function fluid flow out port 28, chamber fluid is displaced and moves through the passageway 19 into the chamber portion that engages seals 22.

In a typical subsea application, the control fluid is water based which has a corrosive effect on the armature, coil and associated metals. The armature is commonly made of iron or steel and the valve body, stainless steel, and the presence of water based fluid coupled with the electrical action of the solenoid causes corrosive electrolytic processes that in turn cause failure in the valve. Seawater may also migrate into the valve cavity by diffusion of the water based fluid through the vent port.

In a preferred embodiment of the invention, the fluid that is introduced is preferably a dielectric fluid such as DC 200 SILCON®, FLORINER®, Transformer oil, or DALLAS 40® hydraulic oil. The fluid may be of any of a variety of non electrolytic fluids to prevent corrosion of the armature and armature chamber.

Figure 2:
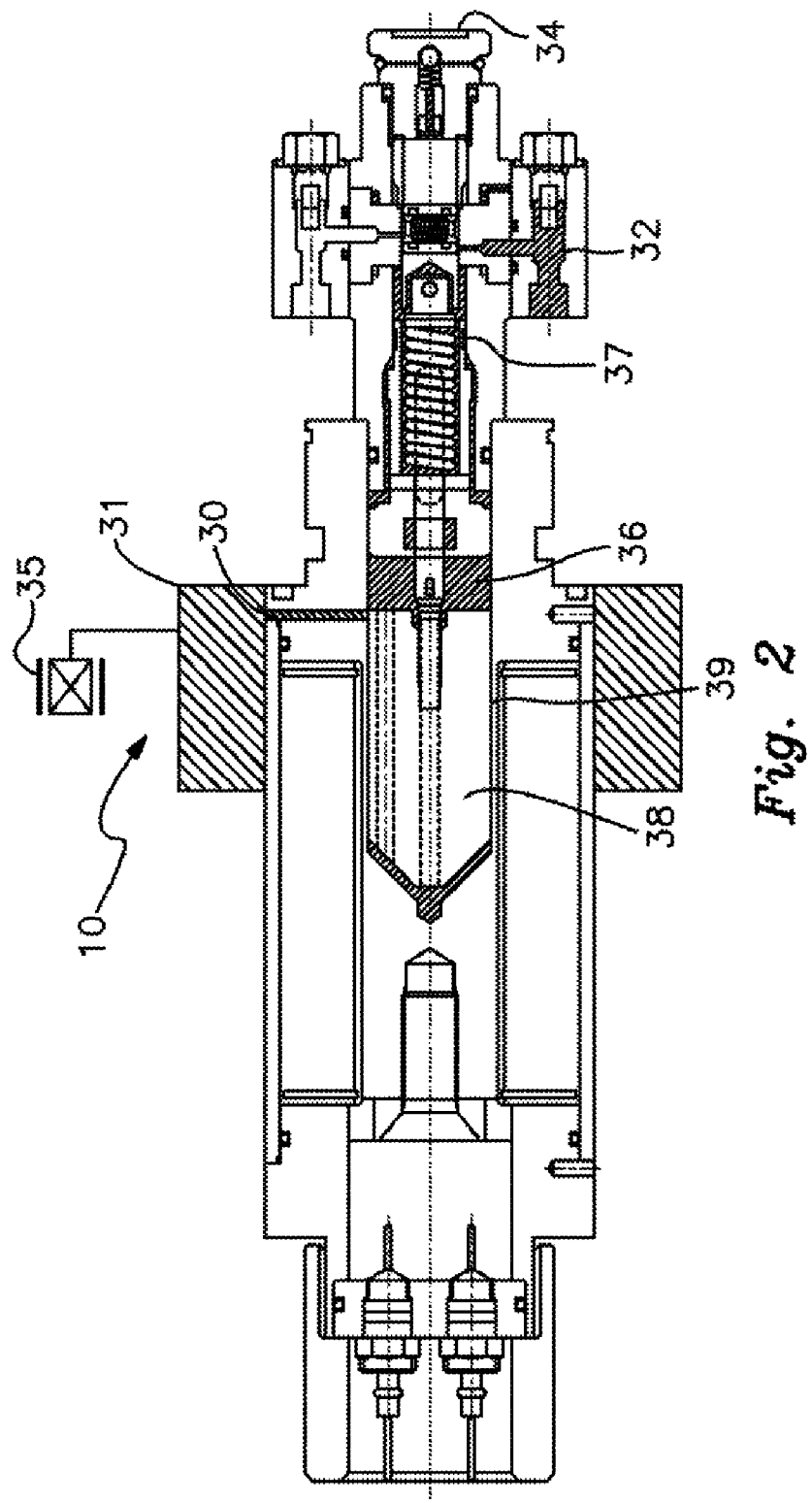
FIG. 2 is a cross sectional schematic diagram of a solenoid showing an internal port to an external housing for introduction of oil to the armature chamber.

In an alternative preferred embodiment of the inventions shown in FIG. 2, the dielectric fluid 36 may be introduced directly into the armature chamber 39 from a surrounding housing of the solenoid valve 10 through internal port 30. Seals 37 prevent the dielectric fluid 36 from entering the fluid flow path of the function fluid 32. Armature 38 is thus encased in dielectric fluid 36 thereby preventing function fluid or seawater from corroding the armature. Rather than have a separate port 12 as shown in FIG. 1, the dielectric fluid would be present in a housing that surrounds solenoid valve 10 which in turn is in fluid communication with each other through the internal port 30. Vent check 34 permits exhaust of function fluid.

Figure 3:
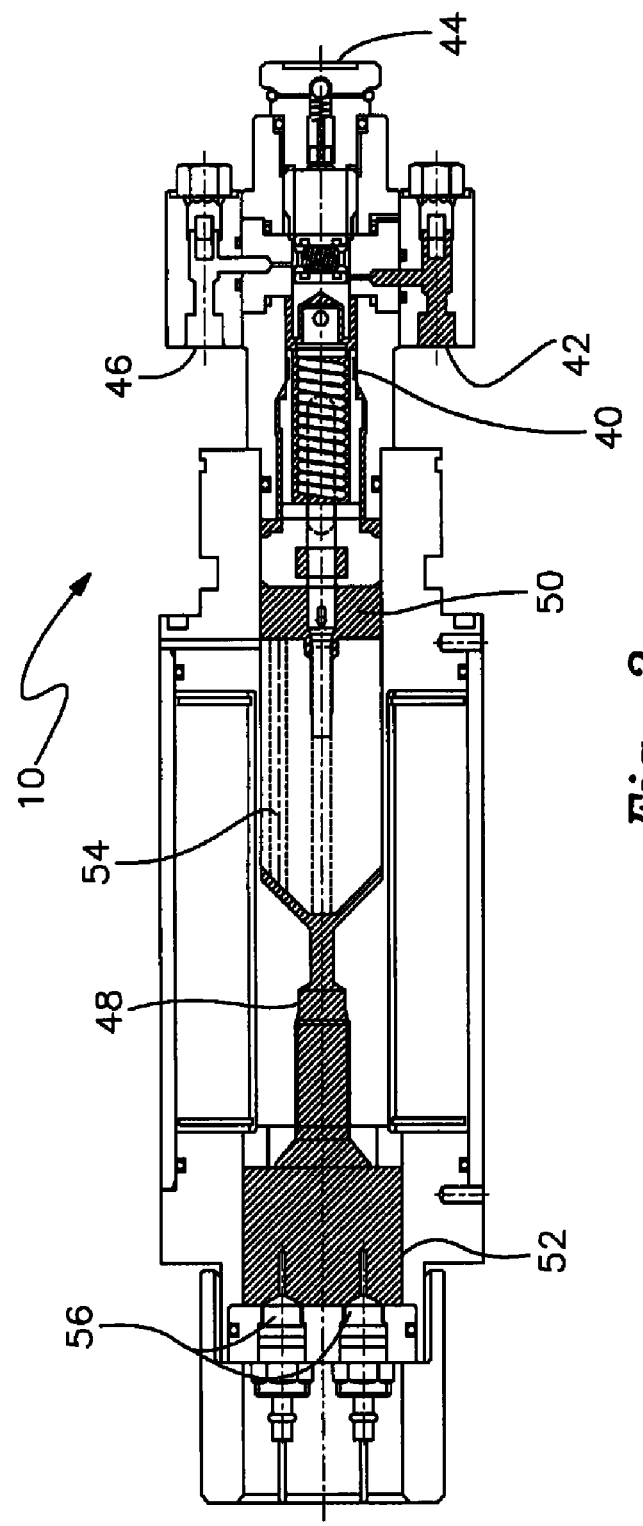
FIG. 3 is a cross sectional schematic diagram of a solenoid showing a closed oil filled chamber in communication with the armature chamber.

FIG. 3 shows another preferred embodiment of the present invention where closed chamber 48 encompasses both the armature and the associated electrodes 56 of the solenoid. In yet another configuration, the oil or other dielectric fluid may also encompass the coil of the solenoid in closed fluid communication with the armature chamber and electrodes in closed chamber 48. By configuring first chamber 50 to be in fluid communication with second chamber 52, the dielectric fluid is maintained in closed chamber 48 by seals 40. The armature has a flowthrough passage 54 which permits chamber fluid flow upon activation of the valve. When the valve is activated, function fluid is permitted to flow from inlet port 46 to outlet port 42 while remaining isolated from closed chamber 48 due to the presence of seals 40. Vent check 44 permits exhaust of function fluid, similar to vent check 34 shown in FIG. 2.

Another feature of the improvement is the ability to monitor and control the pressure of the introduced dielectric fluid into the armature chamber. The port 12 of FIG. 1 or the reservoir 15 connected to the port may be operably connected to pressure transducers to monitor the pressure of the fluid filled armature chamber and associated system. Similarly, pressure transducers 35 may be operably connected to the housing that surrounds solenoid valve 10 in FIG. 2. By using various electronic transducer pickups, data can be taken from the operation of the valve to anticipate valve failure before it happens. This "smart valve" application would also prevent the catastrophic failure associated with the prior art systems.

Certain advantages of the present system include:
  Minor modifications isolate the armature cavity from the function fluid and contamination.
  The filter is eliminated so that plugging cannot occur.
  A non-electrolytic fluid is added to protect and lubricate the iron core armature. The non-electrolytic fluid is plumbed to a balanced reservoir.
  The sticking of solenoid valves due to corrosion is eliminated and the life of the valve is extended resulting is less downtime and less maintenance expense.

The valve has been tested on surface to verify the pull-in and drop-out voltages/force Other potential configurations are achievable to those of ordinary skill in the art including any other fluid filled chamber that separates the armature chamber from the function fluid without departing from the present invention. By separating the function fluid from the armature and associated electrical portion of the valve by some type of oil or dielectric fluid, the benefits of the present invention may be achieved. Such a system further allows monitoring of the valve pressure through pressure transducers and other similar systems by separating the operable portions of the solenoid valve from the function fluid pathways.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the attached claims.

I claim:

1. A controllable solenoid valve, comprising: a valve housing; a slide which is displaceable in the valve housing in an axial direction of the housing between first and second final positions; a seal about said slide which defines a chamber; said chamber filled with a dielectric fluid which engages and surrounds said slide; said chamber is in fluid communication with a reservoir through a port wherein said chamber is positively pressured and maintained substantially at ambient pressure independent of the function fluid pressure; a spring acting upon the slide counter to the magnetic force to maintain the slide in one of the final positions when an electromagnet is not sufficiently energized to drive the slide with force sufficient to completely overcome force of the spring; and a solenoid comprising the electromagnet, the solenoid being operatively connected to the slide so that sufficient electrical energization of the solenoid to produce a magnetic force sufficient to completely overcome force of the spring displaces the slide from one of the final positions to the other of the final positions to permit flow of function fluid and a vent check integral to said housing and operably engaged to said flow to selectively exhaust function fluid.

2. The controllable solenoid valve of claim 1 further comprising a pressure transducer operably connected with said port for monitoring pressure.

3. A controllable solenoid valve, comprising: a valve housing; a slide which is displaceable in the valve housing in an axial direction of the housing between first and second final positions; a seal about said slide which defines a chamber; said chamber filled with a dielectric fluid which engages and surrounds said slide; a second housing around the valve housing that is in fluid communication with said chamber; a spring acting upon the slide counter to the magnetic force to maintain the slide in one of the final positions when an electromagnet is not sufficiently energized to drive the slide with force sufficient to completely overcome force of the spring; and a solenoid comprising the electromagnet, the solenoid being operatively connected to the slide so that sufficient electrical energization of the solenoid to produce a magnetic force sufficient to completely overcome force of the spring displaces the slide from one of the final positions to the other of the final positions to permit flow of function fluid and a vent check integral to said housing and operably engaged to said flow to selectively exhaust function fluid.

4. The controllable solenoid valve of claim 3 further comprising a pressure transducer operably connected to said second housing for monitoring pressure.

5. A controllable solenoid valve, comprising: a valve housing; an armature which is displaceable in the valve housing in an axial direction of the housing between first and second final positions; a seal which defines a chamber; said chamber filled with a dielectric fluid which engages said armature; said chamber is in fluid communication with a reservoir through a port wherein said chamber is positively pressured and maintained substantially at ambient pressure independent of the function fluid pressure; a spring acting upon said armature counter to the magnetic force to maintain said armature in one of the final positions when an electromagnet is not sufficiently energized to drive said armature with force sufficient to completely overcome force of the spring; and a solenoid comprising the electromagnet, the solenoid being operatively connected to said armature so that sufficient electrical energization of the solenoid to produce a magnetic force sufficient to completely overcome force of the spring displaces said armature from one of the final positions to the other of the final positions to permit flow of function fluid and a vent check integral to said housing and operably engaged to said flow to selectively exhaust function fluid.

6. The controllable solenoid valve of claim 5 further comprising a second housing around the valve housing that is in fluid communication with said chamber.

7. The controllable solenoid valve of claim 5 further comprising a pressure transducer connected to said port for monitoring ambient pressure.

8. The controllable solenoid valve of claim 6 further comprising a pressure transducer connected to said second housing for monitoring ambient pressure.

9. A controllable solenoid valve, comprising: a valve housing; a slide which is displaceable in the valve housing in an axial direction of the housing between first and second final positions that permit flow of function fluid and a vent check integral to said housing and operably engaged to said flow to permit selective exhaust of said fluid; a seal about said slide which defines a closed chamber; said chamber filled with a dielectric fluid which engages said slide and isolates said slide from said function fluid; said chamber is in fluid communication to a reservoir through a port wherein said chamber is positively pressured and maintained substantially at ambient pressure independent of the function fluid pressure; a spring acting upon the slide counter to the magnetic force to maintain the slide in one of the final positions when an electromagnet is not sufficiently energized to drive the slide with force sufficient to completely overcome force of a spring; and a solenoid comprising the electromagnet, the solenoid being operatively connected to the slide so that sufficient electrical energization of the solenoid to produce a magnetic force sufficient to completely overcome force of the spring displaces the slide from one of the final positions to the other of the final positions.

10. The controllable solenoid valve of claim 9 wherein the chamber is in fluid communication with the electrodes of the solenoid.

11. The controllable solenoid valve of claim 9 wherein the armature has a flow passage along the axial length of the armature to permit flow of fluid within said chamber.

12. The controllable solenoid valve of claim 9 wherein the chamber is in fluid communication with the coil of the solenoid.

* * * * *